April 30, 1963     C. BAUR ETAL     3,087,384
TRIPLET WIDE-ANGLE OBJECTIVE LENS
Filed Dec. 8, 1959
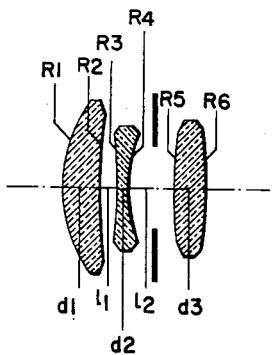
INVENTORS
CARL BAUR
FRIEDBERT FREITAG
BY *Connolly and Hutz*
ATTORNEYS

United States Patent Office 3,087,384
Patented Apr. 30, 1963

3,087,384
TRIPLET WIDE-ANGLE OBJECTIVE LENS
Carl Baur, Baldham, near Munich, and Friedbert Freitag, Unterhaching, near Munich, Germany, assignors to Agfa Aktiengesellschaft, Leverkusen-Bayerwerk, Germany, a corporation of Germany
Filed Dec. 8, 1959, Ser. No. 858,119
Claims priority, application Germany Jan. 24, 1959
3 Claims. (Cl. 88—57)

This invention relates to a triplet wide-angle objective lens for photographic use, and more particularly relates to such a lens having a medium aperture ratio and preferably being capable of focusing by means of movement of its front component.

A lens made in accordance with this invention incorporates a positive meniscus disposed on the object side of the lens which is made of glass having a refractive index for the d-line of the line of the spectrum greater than 1.675. It also incorporates a biconvex lens disposed on the image side of the objective and a biconcave lens disposed between the two aforementioned lenses having one surface which is considerably more curved than the other and being arranged with its surface of lesser curvature facing the meniscus.

Triplet lens systems have been used in many different configurations; however, they are rarely used as wide-angle objectives. An object of this invention is to provide a wide-angle objective incorporating only three lenses having a medium aperture ratio and being capable of focusing by movement of the front lens. It unexpectedly provides an image which is not inferior to those provided by wide-angle objectives having a greater number of lenses or components, but it is less expensive and easier to fabricate than those multilens objectives.

In accordance with this invention, a triplet wide-angle photographic objective of the type described is provided by arranging the surface refractive power $$\frac{\Delta n}{R}$$

of the second surface as well as the third surface to have absolute values which are not less than the reciprocal of 4.5 times the focal length of the objective and not more than the reciprocal of 1.8 times the focal length in accordance with the following formulas:

$$\frac{1}{4.5f'} \leq \left|\frac{\Delta n_2}{R_2}\right| \leq \frac{1}{1.8f'}$$

$$\frac{1}{4.5f'} \leq \left|\frac{\Delta n_3}{R_3}\right| \leq \frac{1}{1.8f'}$$

In accordance with another characteristic of this invention, the second axial air spacing, $l_2$, is not less than 2.5 times and not greater than 4 times the first axial air spacing, $l_1$, in accordance with the following formula:

$$2.5 l_1 \leq l_2 \leq 4 l_1$$

In addition, the sum of all the lens thicknesses of the objective $$\sum_{\gamma=1}^{3} d_\gamma$$

is not less than 3 times and not greater than 10 times the first axial air spacing, $l_1$, in accordance with the following formula:

$$3 l_1 \leq \sum_{\gamma=1}^{3} d_\gamma \leq 10 l_1$$

Furthermore, the ratio of the arithmetic sums of the surface refractive powers of the positive meniscus to the corresponding values of the biconvex lens is not less than 1.4 and not greater than 1.9 in accordance with the following formula:

$$1.4 \leq \frac{\frac{\Delta n_1}{R_5} + \frac{\Delta n_2}{R_2}}{\frac{\Delta n_1}{R_5} + \frac{\Delta n_6}{R_6}} \leq 1.9$$

For obtaining a wide angle of view, it is important that the positive lens disposed adjacent the object has a strongly defined meniscus form while the negative lens incorporates a third surface which is decidedly weak relative to those of ordinary three lens systems. Furthermore, it is important in focusing by movement of the front lens that the refractive power of this front lens is made relatively strong, and correspondingly the first axial air spacing be made relatively small. To provide a favorable marginal brightness for the relatively large diameter first and last lenses, the examples display relatively great lens thicknesses which also facilitate their manufacture.

Novel features and advantages of the present invention will become apparent to one skilled in the art from a reading of the following description in conjunction with the accompanying drawing wherein similar reference characters refer to similar parts and in which the single figure is a schematic representation of an embodiment of this invention with the radii of curvature being represented by $R_1 \ldots R_6$; the axial lens thicknesses being represented by $d_1 \ldots d_3$; and the axial air spacings being represented by $l_1 \ldots l_2$. In the following examples of this invention and in the drawing, the constructional factors are progressively numbered proceeding in a direction toward the image plane, the refractive indices of the glasses, $n_{d1} \ldots n_{d3}$, refer to the $n_d$-line of the spectrum (587.6 m$\mu$), and the Abbe numbers or dispersive powers are represented by $v_1$, $v_2$ and $v_3$.

*Example I*

[Aperture ratio 1:4.5. Angle of view 58°–60°. Focal length $f'=100$]

| Lens | | Glass | |
|---|---|---|---|
| Radius | Thickness or Axial Separation | Refractive Index $n_d$ | Dispersive Power $v$ |
| $R_1 = +25.7$ | $d_1 = 5.9$ | $n_{d1} = 1.7130$ | $v_1 = 53.9$ |
| $R_2 = +169.0$ | $l_1 = 2.9$ | | |
| $R_3 = -176.0$ | $d_2 = 2.0$ | $n_{d2} = 1.6166$ | $v_2 = 36.6$ |
| $R_4 = +23.1$ | $l_2 = 9.7$ | | |
| $R_5 = +120.0$ | $d_3 = 5.7$ | $n_{d3} = 1.6385$ | $v_3 = 55.5$ |
| $R_6 = -81.5$ | | | |

*Example II*

[Aperture ratio 1:4.0. Angle of view 58°–60°. Focal length $f'=100$]

| Lens | | Glass | |
|---|---|---|---|
| Radius | Thickness or Axial Separation | Refractive Index $n_d$ | Dispersive Power $v$ |
| $R_1 = +28.5$ | $d_1 = 7.5$ | $n_{d1} = 1.7440$ | $v_1 = 44.9$ |
| $R_2 = +254.0$ | $l_1 = 2.6$ | | |
| $R_3 = -154.0$ | $d_2 = 2.0$ | $n_{d2} = 1.6990$ | $v_2 = 30.0$ |
| $R_4 = +27.0$ | $l_2 = 9.6$ | | |
| $R_5 = +179.0$ | $d_3 = 5.5$ | $n_{d3} = 1.7440$ | $v_3 = 44.9$ |
| $R_6 = -78.2$ | | | |

Example III

[Aperture ratio 1:3.5. Angle of view 58°–60°. Focal lenght $f'=100$]

| Lens | | Glass | |
|---|---|---|---|
| Radius | Thickness or Axial Separation | Refractive Index $n_d$ | Dispersive Power $v$ |
| $R_1=+\ 32.1$ | $d_1=8.5$ | $n_{d1}=1.7884$ | $v_1=50.4$ |
| $R_2=+165.0$ | $l_1=3.7$ | | |
| $R_3=-175.0$ | $d_2=2.0$ | $n_{d2}=1.6502$ | $v_2=33.7$ |
| $R_4=+\ 29.1$ | $l_2=10.0$ | | |
| $R_5=+151.0$ | $d_3=6.0$ | $n_{d3}=1.7130$ | $v_3=53.9$ |
| $R_6=-\ 84.4$ | | | |

Wide angle objectives of the general types described in Examples I, II and III which are particularly advantageous from an optical as well as a manufacturing viewpoint may be made by utilizing the aforementioned constructional factors and those differing therefrom by the following ratios:

(1) Not more than $$\frac{\pm 0.2}{f'}$$

in the surface refractive powers $$\frac{\Delta n}{R}$$

(2) Not more than $\pm 0.03 f'$ in lens thicknesses and axial air spacings;
(3) Not more than $\pm 0.03$ in refractive indices with reference to the $d$-line of the spectrum; and
(4) Not more than $\pm 5$ units in $v$-values.

What is claimed is:

1. A photographic wide-angle objective lens having three components of medium aperture ratio being capable of focusing by movement of its front component, said objective lens comprising a meniscus of positive refractive power disposed on the object side of said objective lens, a biconvex component disposed on the image side of said objective lens and a biconcave component disposed between said meniscus and said biconvex lens, and having numerical data with all constructional factors progressively numbered proceeding in a direction toward the image plane substantially as follows:

[Aperture ratio 1:4.5. Angle of view 58°–60°. Focal length $f'=100$]

| Lens | | Glass | |
|---|---|---|---|
| Radius | Thickness or Axial Separation | Refractive Index $n_d$ | Dispersive Power $v$ |
| $R_1=+\ 25.7$ | $d_1=5.9$ | $n_{d1}=1.7130$ | $v_1=53.9$ |
| $R_2=+169.0$ | $l_1=2.9$ | | |
| $R_3=-176.0$ | $d_2=2.0$ | $n_{d2}=1.6166$ | $v_2=36.6$ |
| $R_4=+\ 23.1$ | $l_2=9.7$ | | |
| $R_5=+120.0$ | $d_3=5.7$ | $n_{d3}=1.6385$ | $v_3=55.5$ |
| $R_6=-\ 81.5$ | | | | in which:

$R_1, R_2 \ldots$ represent the radii of curvature,
$d_1, d_2 \ldots$ represent the axial thicknesses of the lenses,
$l_1, l_2 \ldots$ represent the axial air spacings,
$n_{d1}, n_{d2} \ldots$ represent the refractive indices relative to the $d$-line of the spectrum, and
$v_1, v_2 \ldots$ represent the dispersive powers.

2. A photographic wide-angle objective lens having three components of medium aperture ratio being capable of focusing by movement of its front component, said objective lens comprising a meniscus of positive refractive power disposed on the object side of said objective lens, a biconvex component disposed on the image side of said objective lens and a biconcave component disposed between said meniscus and said biconvex lens, and having numerical data with all constructional factors progressively numbered proceeding in a direction toward the image plane substantially as follows:

[Aperture ratio 1:4.0. Angle of view 58°–60°. Focal length $f'=100$]

| Lens | | Glass | |
|---|---|---|---|
| Radius | Thickness or Axial Separation | Refractive Index $n_d$ | Dispersive Power $v$ |
| $R_1=+\ 28.5$ | $d_1=7.5$ | $n_{d1}=1.7440$ | $v_1=44.9$ |
| $R_2=+254.0$ | $l_1=2.6$ | | |
| $R_3=-154.0$ | $d_2=2.0$ | $n_{d2}=1.6990$ | $v_2=30.0$ |
| $R_4=+\ 27.0$ | $l_2=9.6$ | | |
| $R_5=+179.0$ | $d_3=5.5$ | $n_{d3}=1.7440$ | $v_3=44.9$ |
| $R_6=-\ 78.2$ | | | | in which:

$R_1, R_2 \ldots$ represent the radii of curvature,
$d_1, d_2 \ldots$ represent the axial thicknesses of the lenses,
$l_1, l_2 \ldots$ represent the axial air spacings,
$n_{d1}, n_{d2} \ldots$ represent the refractive indices relative to the $d$-line of the spectrum, and
$v_1, v_2 \ldots$ represent the dispersive powers.

3. A photographic wide-angle objective lens having three components of medium aperture ratio being capable of focusing by movement of its front component, said objective lens comprising a meniscus of positive refractive power disposed on the object side of said objective lens, a biconvex component disposed on the image side of said objective lens and a biconcave component disposed between said meniscus and said biconvex lens, and having numerical data with all constructional factors progressively numbered proceeding in a direction toward the image plane substantially as follows:

[Aperture ratio 1:3.5. Angle of view 58°–60°. Focal length $f'=100$]

| Lens | | Glass | |
|---|---|---|---|
| Radius | Thickness or Axial Separation | Refractive Index $n_d$ | Dispersive Power $v$ |
| $R_1=+\ 32.1$ | $d_1=8.5$ | $n_{d1}=1.7884$ | $v_1=50.4$ |
| $R_2=+165.0$ | $l_1=3.7$ | | |
| $R_3=-175.0$ | $d_2=2.0$ | $n_{d2}=1.6502$ | $v_2=33.7$ |
| $R_4=+\ 29.1$ | $l_2=10.0$ | | |
| $R_5=+151.0$ | $d_3=6.0$ | $n_{d3}=1.7130$ | $v_3=53.9$ |
| $R_6=-\ 84.4$ | | | | in which:

$R_1, R_2 \ldots$ represent the radii of curvature,
$d_1, d_2 \ldots$ represent the axial thicknesses of the lenses,
$l_1, l_2 \ldots$ represent the axial air spacings,
$n_{d1}, n_{d2} \ldots$ represent the refractive indices relative to the $d$-line of the spectrum, and
$v_1, v_2 \ldots$ represent the dispersive powers.

References Cited in the file of this patent
UNITED STATES PATENTS

| | | |
|---|---|---|
| 1,987,878 | Tronnier | Jan. 15, 1935 |
| 2,279,372 | Herzberger | Apr. 14, 1942 |
| 2,446,402 | Aklin | Aug. 3, 1948 |
| 2,818,777 | Hudson et al. | Jan. 7, 1958 |
| 2,966,825 | Baur et al. | Jan. 3, 1961 |